(12) United States Patent
Kucernak

(10) Patent No.: US 10,483,583 B2
(45) Date of Patent: Nov. 19, 2019

(54) FUEL CELL

(71) Applicant: Imperial Innovations Limited, London (GB)

(72) Inventor: Anthony Robert John Kucernak, London (GB)

(73) Assignee: Imperial Innovations Limited, London (GB)

( * ) Notice: Subject to any disclaimer, the term of this patent is extended or adjusted under 35 U.S.C. 154(b) by 278 days.

(21) Appl. No.: 14/398,436

(22) PCT Filed: May 3, 2013

(86) PCT No.: PCT/GB2013/051162
§ 371 (c)(1),
(2) Date: Oct. 31, 2014

(87) PCT Pub. No.: WO2013/164639
PCT Pub. Date: Nov. 7, 2013

(65) Prior Publication Data
US 2015/0086895 A1    Mar. 26, 2015

(30) Foreign Application Priority Data
May 3, 2012 (GB) .................................. 1207759.0

(51) Int. Cl.
*H01M 8/24* (2016.01)
*H01M 8/02* (2016.01)
(Continued)

(52) U.S. Cl.
CPC ......... *H01M 8/241* (2013.01); *H01M 8/0258* (2013.01); *H01M 8/0263* (2013.01);
(Continued)

(58) Field of Classification Search
CPC ................ H01M 8/0247–0269; H01M 8/0297
See application file for complete search history.

(56) References Cited

U.S. PATENT DOCUMENTS 3,484,298 A    12/1969  Nichols
4,889,766 A    12/1989  Inuzuka et al.
(Continued)

FOREIGN PATENT DOCUMENTS

CN    1503998 A    6/2004
CN    101124691 A    2/2008
(Continued)

OTHER PUBLICATIONS

"Related UK Patent Application No. GB 1207759.0", "Search Report", dated Feb. 14, 2013, Publisher: UK IPO, Published in: UK.
(Continued)

*Primary Examiner* — Jonathan G Leong
*Assistant Examiner* — Jacob Buchanan
(74) *Attorney, Agent, or Firm* — Kaplan Breyer Schwarz, LLP

(57) ABSTRACT

A fuel cell assembly is disclosed comprising a fuel cell electrode component and a reactant gas flow component ink bonded thereto. In one aspect direct bonding of a gas diffusion layer with a flow field is achieved allowing a simplified structural configuration. In another aspect improved component printing techniques reduce corrosion effects. In a further aspect flow fields are described providing reactant channels extending in both the horizontal and vertical directions, i.e. providing three dimensional flow. In a further aspect an improved wicking material allows wicking away and reactant humidification. In a further aspect improved mechanical fastenings and connectors are provided. In a further aspect improved humidification approaches are described. Further improved aspects are additionally disclosed.

3 Claims, 19 Drawing Sheets

(51) Int. Cl.
*H01M 8/04* (2016.01)
*H01M 8/241* (2016.01)
*H01M 8/2483* (2016.01)
*H01M 8/2465* (2016.01)
*H01M 8/248* (2016.01)
*H01M 8/0258* (2016.01)
*H01M 8/0297* (2016.01)
*H01M 8/0263* (2016.01)
*H01M 8/0267* (2016.01)
*H01M 8/04291* (2016.01)
*H01M 8/0202* (2016.01)
*H01M 8/04119* (2016.01)
*H01M 8/04082* (2016.01)
*H01M 8/1018* (2016.01)

(52) U.S. Cl.
CPC ....... *H01M 8/0267* (2013.01); *H01M 8/0297* (2013.01); *H01M 8/04291* (2013.01); *H01M 8/248* (2013.01); *H01M 8/2465* (2013.01); *H01M 8/2483* (2016.02); *H01M 8/0269* (2013.01); *H01M 8/04171* (2013.01); *H01M 8/04201* (2013.01); *H01M 2008/1095* (2013.01)

(56) References Cited

U.S. PATENT DOCUMENTS

| | | | | |
|---|---|---|---|---|
| 5,836,383 | A * | 11/1998 | Zwittig | F28D 1/0375 165/167 |
| 2003/0118889 | A1 | 6/2003 | Smith | |
| 2004/0018412 | A1 * | 1/2004 | Orsbon | H01M 8/0258 429/434 |
| 2004/0157103 | A1 * | 8/2004 | Takeguchi | H01M 8/0258 429/413 |
| 2004/0166393 | A1 * | 8/2004 | Akita | H01M 8/0258 429/457 |
| 2005/0175888 | A1 * | 8/2005 | Sasahara | H01M 4/8605 429/482 |
| 2005/0233186 | A1 * | 10/2005 | Ryoichi | H01M 8/04223 429/432 |
| 2005/0260473 | A1 | 11/2005 | Wang | |
| 2006/0075630 | A1 | 4/2006 | Valentine et al. | |
| 2006/0099479 | A1 | 5/2006 | Friedman et al. | |
| 2008/0014486 | A1 * | 1/2008 | Unoki | H01M 8/0247 429/434 |
| 2009/0004542 | A1 | 1/2009 | Budinski | |

FOREIGN PATENT DOCUMENTS

| | | |
|---|---|---|
| CN | 101335357 A | 12/2008 |
| DE | 4309976 A1 | 9/1994 |
| EP | 1434292 A1 | 6/2004 |
| GB | 2323700 A | 9/1998 |
| GB | 2336712 A | 10/1999 |
| JP | H09134732 A | 5/1997 |
| JP | 2001-297778 A | 10/2001 |
| JP | 2002-518815 A | 6/2002 |
| JP | 2002-334704 A | 11/2002 |
| JP | 2005-216598 A | 8/2005 |
| JP | 2005-527092 A | 9/2005 |
| JP | 2006-093092 A | 4/2006 |
| JP | 2006-277963 A | 10/2006 |
| JP | 2007-287487 A | 11/2007 |
| JP | 2010-225484 A | 10/2010 |
| JP | 2010-272474 A | 12/2010 |
| WO | 9634421 A1 | 10/1996 |
| WO | 2005096421 A1 | 10/2005 |

OTHER PUBLICATIONS

"Related International Application No. PCT/GB2013/051162", "International Search Report and Written Opinion", dated Oct. 7, 2013, Publisher: ISA / EPO, Published in: EP.

"First Office Action" dated Apr. 1, 2016, issued in counterpart Chinese Patent Application No. 201380025575.2, Published in: CN.

* cited by examiner

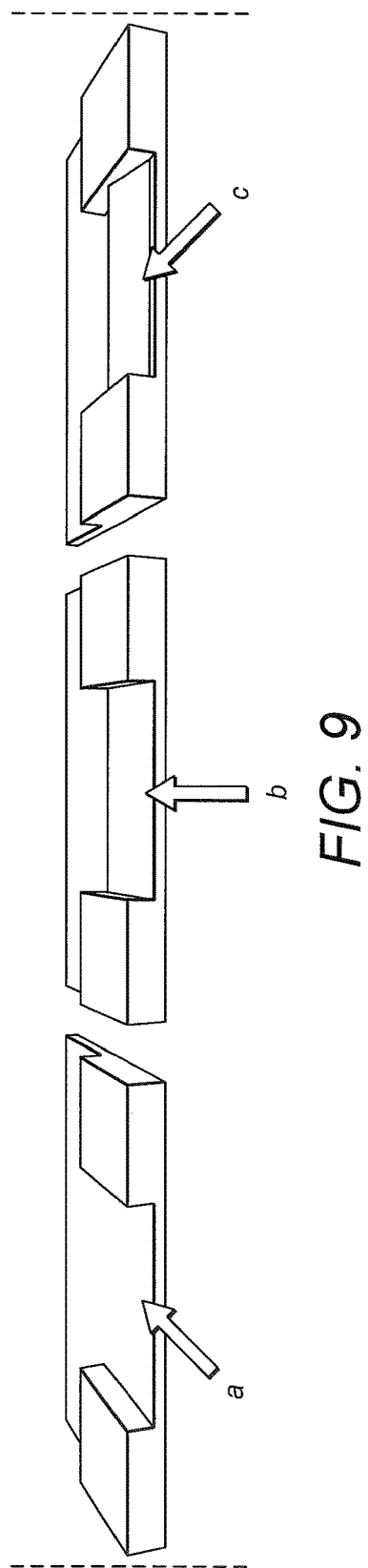

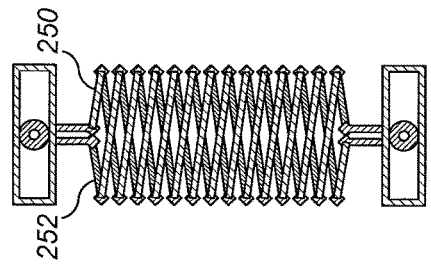
FIG. 12a
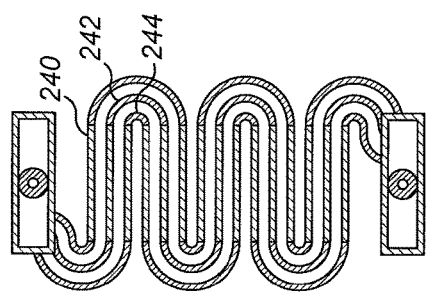
FIG. 12b
FIG. 12c
FIG. 12d
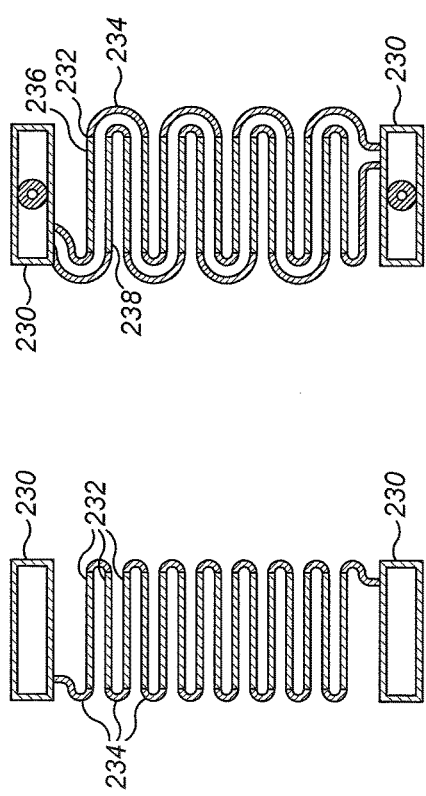
FIG. 12e
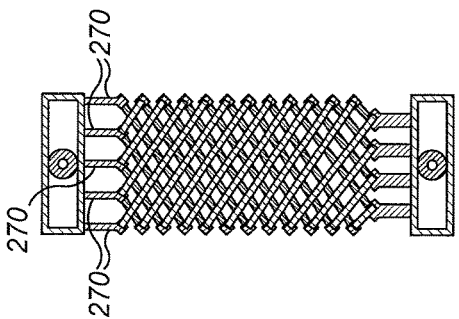
FIG. 12f
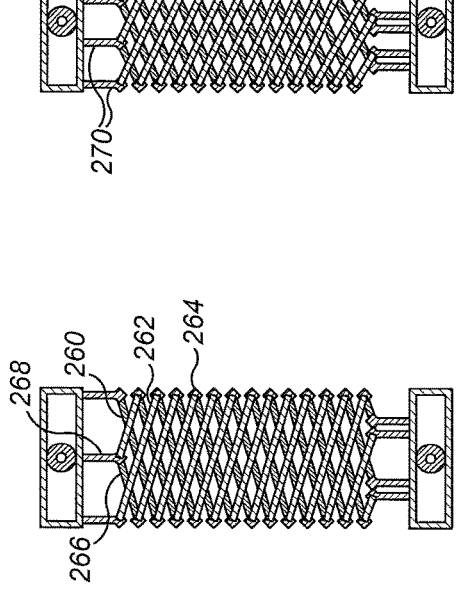
FIG. 12g

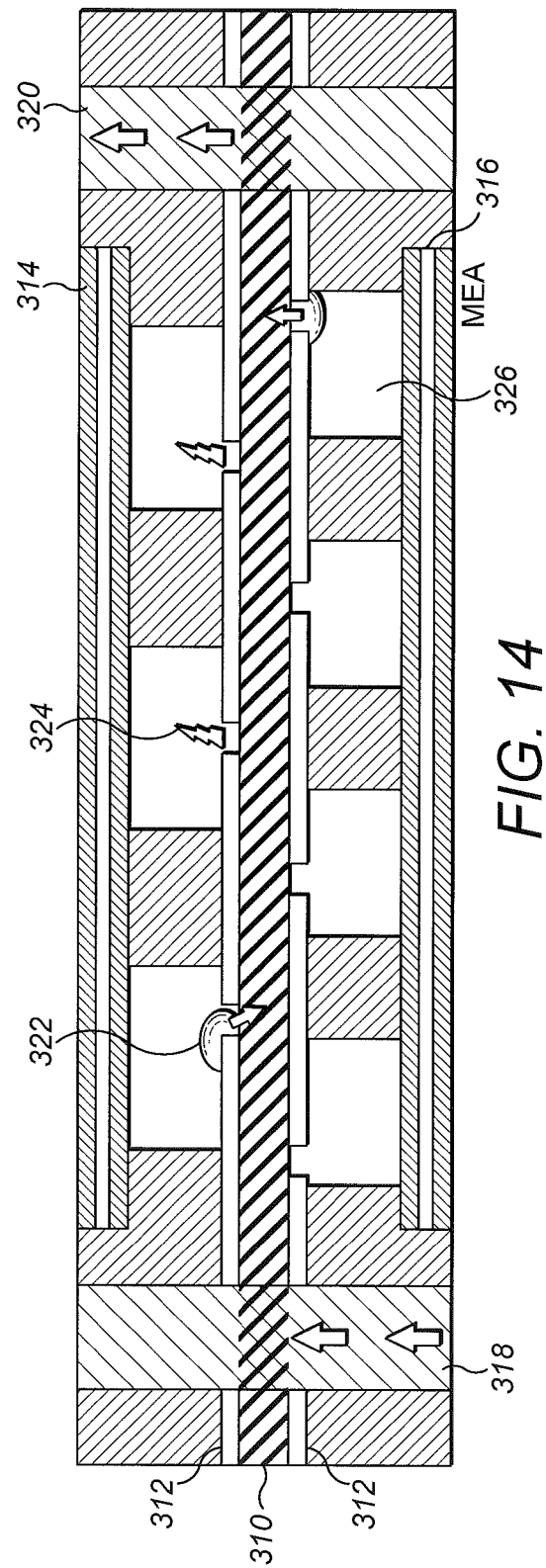

FUEL CELL

CROSS REFERENCE TO RELATED APPLICATIONS

This application is a national phase of PCT application No. PCT/GB2013/051162, filed 3 May 2013, which claims priority to GB patent application No. 1207759.0, filed 3 May 2012, all of which are incorporated herein by reference.

TECHNICAL FIELD

This invention relates to fuel cells, for example solid polymer electrolyte fuel cells. This invention also relates to the use of Printed Circuit Board (PCB) technology in the manufacture of fuel cells of the present invention, and the use of corrosion-resistant coatings.

BACKGROUND ART

A fuel cell is an electrochemical device which generates electrical energy and heat from an oxidant (e.g. pure oxygen or air) and a fuel (e.g. hydrogen or a hydrogen-containing mixture, or a hydrocarbon or hydrocarbon derivative). Fuel cell technology finds application in portable, mobile and stationary applications, such as power stations, vehicles and laptop computers.

Typically, a cell comprises two electrodes, an anode and a cathode, which are separated by an electrolyte membrane that allows ions (e.g. hydrogen ions) but not free electrons to pass through from one electrode to the other. A catalyst layer on the electrodes accelerates a reaction with the fuel (on the anode electrode) and oxidant (on the cathode electrode) to create or consume the ions and electrons. The electrons freed at the anode form an electrical current, which is used to perform work and then flows to the cathode where the electrons are consumed.

A single pair of electrodes separated by an electrolyte membrane is called a Membrane Electrode Assembly (MEA). A fuel cell MEA operating under a moderate load produces an output voltage of about 0.7 V, which is too low for many practical considerations. Conventionally, in order to increase this voltage, MEAs are assembled into a stack as shown in FIG. 1. Each MEA 1 has a layer of "electrolyte membrane" 1a, which is an ion-permeable membrane sandwiched between two electrolyte layers, and an anode 2 and a cathode 3 on opposite faces of the electrolyte membrane. Adjacent MEAs can be separated by an electrically conducting bipolar separator plate 4 and hydrogen fuel 5 and oxygen gas 6 flow through the channels provided on opposed faces of the bipolar plate. End plates 9 are connected to an external circuit via an electrical connection 7, 8. The number of these MEAs in a stack in a fuel cell determines the total voltage, and the surface area of each membrane electrode determines the total current.

A problem with current fuel cell geometry is that when fuel cells are stacked in this manner, the electrical current flows perpendicular to the face of an MEA. Hence, this stacking requires separator plates to conduct the current from the positive electrode of one cell to the negative electrode of the next. Furthermore, failure of an MEA, for example due to pinhole formation through the membrane electrolyte or short-circuiting of electrodes across the membrane, results in the entire stack needing to be shut down. Yet further, if a single MEA is not performing as well as the others, current will be driven through it, which results in its rapid degradation. If one MEA is destroyed then the whole fuel cell stack becomes unusable.

In the known arrangement the bipolar plates are commonly made of graphite carbon or stainless steel and must be electrically conductive, gas impervious and incorporate the flow-field channels for the distribution of reactants, and possibly also of coolant, across the faces of the MEA in their surface. Thus, the material composition of the bipolar plates is constrained and the plates are complex and expensive to manufacture. Furthermore, maintaining the correct water content in the electrolyte membrane is essential to optimising its performance. The membrane requires a certain level of moisture to operate and conduct the ionic current efficiently so that the cell current does not drop. Water produced by the cell is removed by the flow of gas along the cathode, or wicked away. Accordingly, corrosion of metallic bipolar plates in the humid environment of the cell is a common problem, limiting the materials from which the bipolar plate can be made. Overheating of the fuel cell stack is a further problem and cooling is necessary. This is usually achieved by the provision of further plates comprising channels to circulate coolant water through the middle of the stack, which is cumbersome and impractical for many applications. Further still, the electrical output of a stack is modulated and regulated by using monolithic power electronics. This is expensive and point failure of these power electronics also leads to failure of the whole fuel cell system.

One known alternative is described in "New SPFC-Technology with Plastics", by K. Ledjeff and R. Nolte, Proceedings of the First International Symposium on New Materials for Fuel Cell Systems, 1995, p 128-134. The authors describe a banded structure of a single electrolyte membrane to generate a high output voltage, without employing stack technology. The electrodes and bipolar plates of a standard construction fuel cell are mounted in a co-planar configuration, with each fuel cell MEA present as a band joined to a second adjacent MEA band. A problem with this approach is that the membrane structure requires careful assembly and sealing of the adjacent bands to avoid mixing of oxidant and fuel.

In other approaches, for example as described in PCT/EP2012/053479 a fuel cell stack is described including a plurality of MEAs separated by a PCB board for current collection and distribution and reactant distribution. However, it is desirable to improve on previous arrangements yet further.

The invention is set out in the claims.

BRIEF DESCRIPTION OF THE FIGURES

Specific embodiments of the invention will now be described by reference to the accompanying Figures in which:

FIG. 8 (c) shows a plan view of the individual layers of a fuel cell board of the further embodiment.

FIG. 9 shows the lower half of a reactant channel and illustrates the use of a Shape Memory Alloy (SMA) as a low profile valve.

FIGS. 12a to 12g shows alternative two and three dimensional flow field configurations.

FIG. 14 shows a humidification layer in a fuel cell.

In overview, the invention relates to improvements to existing fuel cell configurations. In one aspect direct bonding of a gas diffusion layer with a flow field is achieved allowing a simplified structural configuration. In another aspect improved component printing techniques reduce corrosion effects. In a further aspect flow fields are described providing reactant channels extending in both the horizontal and vertical directions, i.e. providing three dimensional flow. In a further aspect an improved wicking material allows wicking away and reactant humidification. In a further aspect improved mechanical fastenings and connectors are provided. In a further aspect improved humidification approaches are described. Further improved aspects are additionally discussed below.

By way of introduction an embodiment of a fuel cell stack is described next.

Figure 1:
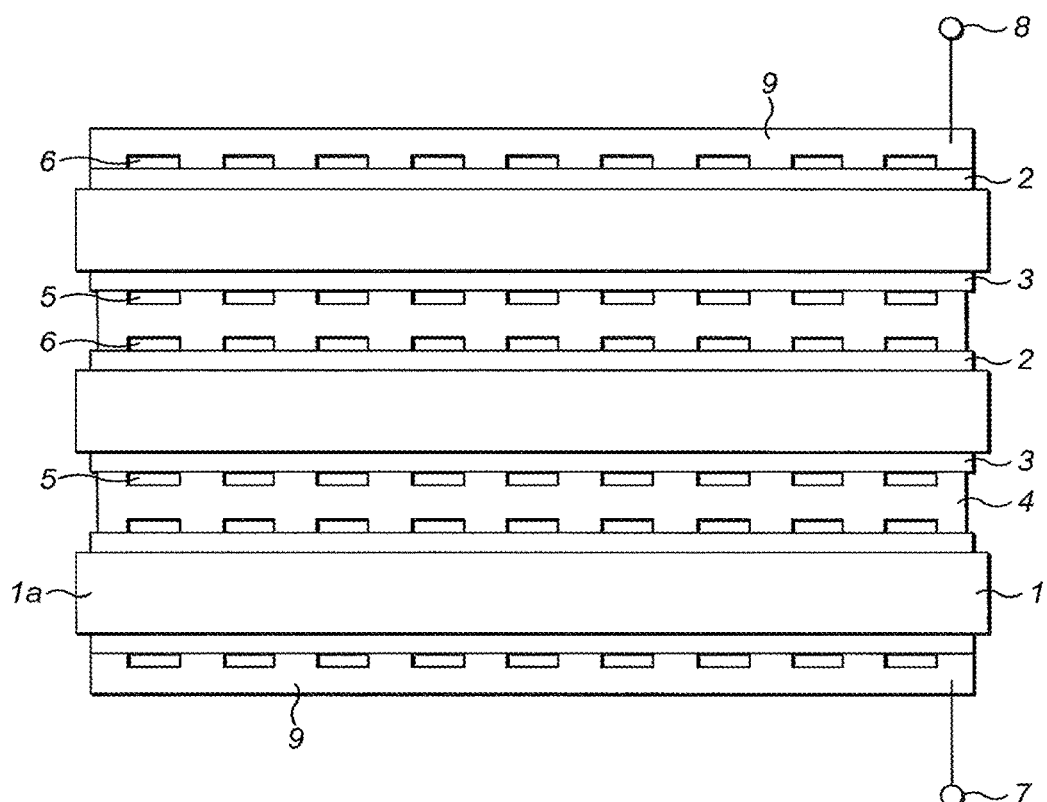
FIG. 1 shows a schematic side view of a stacked fuel cell of the known type.
Figure 2:
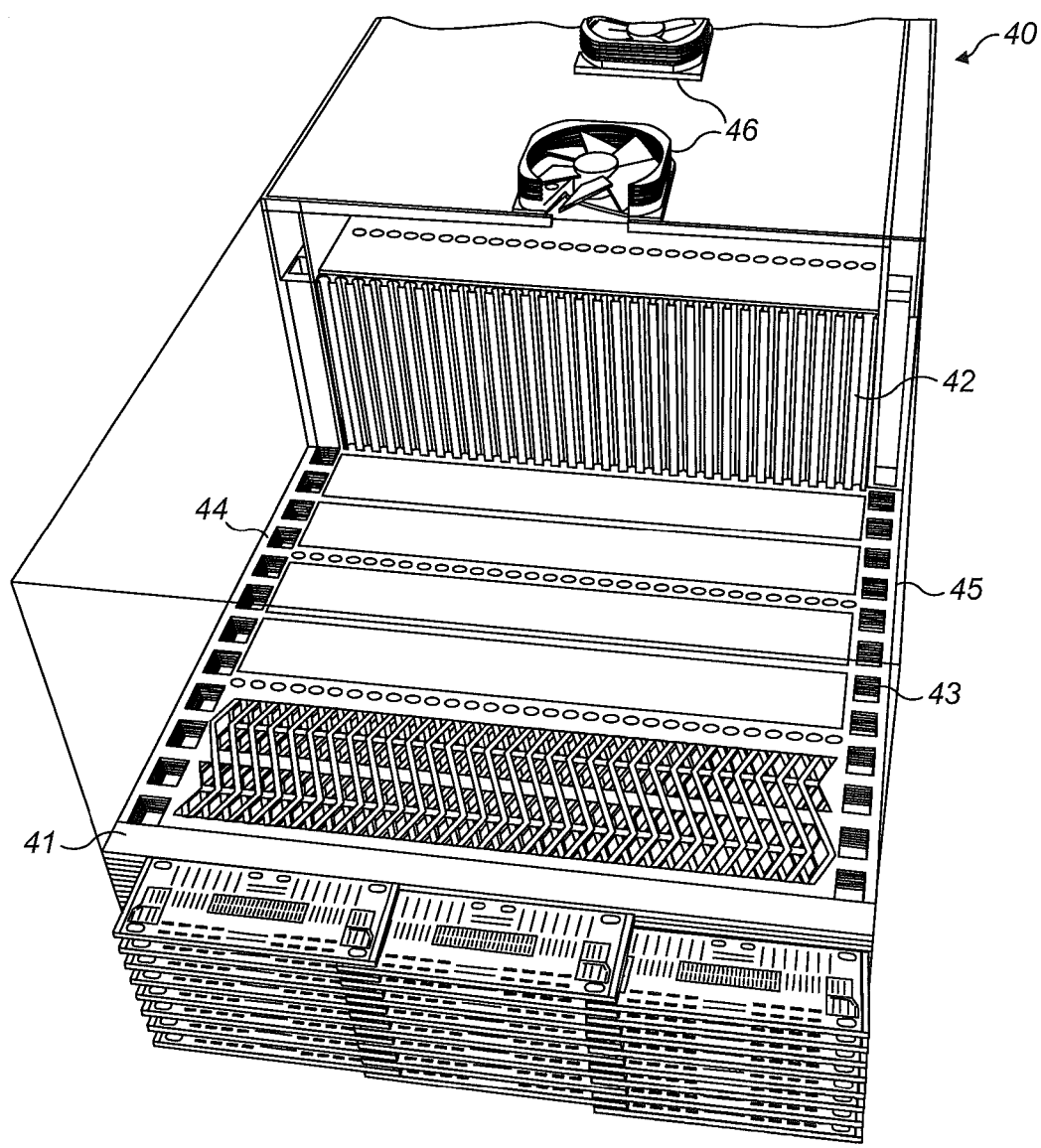
FIG. 2 shows a perspective, partial cut-away view of a fuel cell stack of an embodiment.
Figure 3:
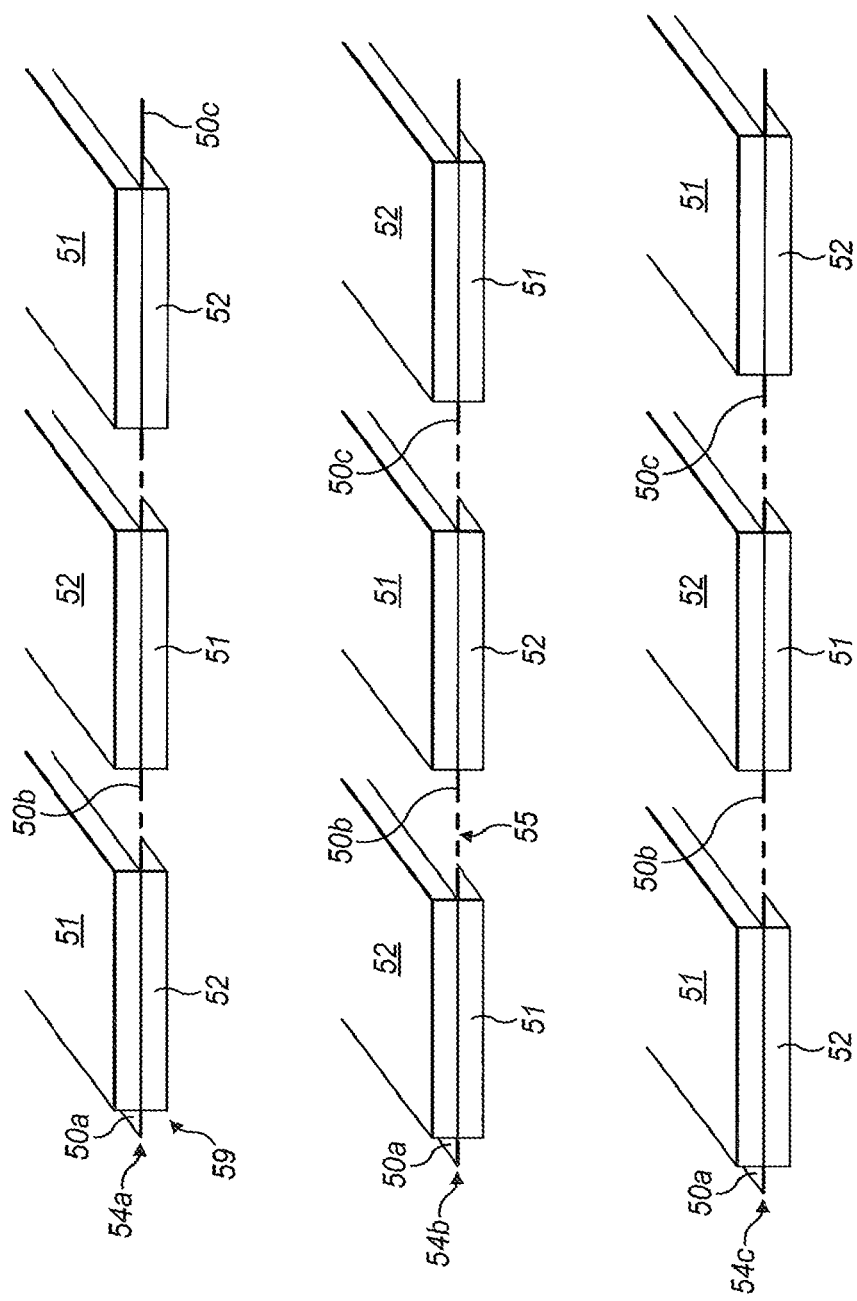
FIG. 3 shows an exploded view of a section of the fuel cell detailing the MEA layout of the embodiment.

In an embodiment, a fuel cell stack 40 is provided. A perspective, partial cut-away view is shown in FIG. 2 and is described in more detail in reference to FIG. 3. FIG. 3 shows an exploded view of a section of the fuel cell detailing the MEA layout. Each fuel cell board 41 of the fuel cell stack comprises a plurality of polymer electrolyte membranes 50a, 50b, 50c, etc., each of these membranes supporting an anode 51 and a cathode 52. Alternatively, each fuel cell board may comprise one single polymer electrolyte membranes, which supports a plurality of anodes and cathodes. This does not alter the mode of operation described below.

For clarity, the construction of the fuel cell boards and the fuel cell stack is described herein in terms of 'horizontal' and 'vertical' planes, in accordance with the embodiments illustrated in the Figures. However, these terms are used for clarity only, and are not limiting on the scope of the invention. It will be clear to the reader that the fuel cell boards can be arranged in any plane, not just the horizontal plane. Further, the term 'directly opposite' is not limited to the electrodes being in register.

The anode lies on one face of the polymer electrolyte and lies directly opposite a cathode on the opposite face of the same electrolyte membrane layer. Together, the anode, cathode and electrolyte layer form an MEA 59. In one (horizontal) plane, anodes on one face of a polymer electrolyte layer 50a are adjacent to cathodes on the same face of the adjacent electrolyte layer 50b. That is, in a horizontal plane, the sequence of anode and cathode positioning in adjacent MEAs alternates for each MEA. If one single polymer electrolyte membrane is used, the sequence of anodes and cathodes along each face alternates, with the respective cathodes and anodes on the opposite face also alternating.

Thus, each fuel cell board comprises an alternating sequence of anodes and cathodes on its two opposing faces. Anodes and cathodes on each face of the electrolyte membrane in a horizontal plane are separated by gaps 55. In the corresponding vertical plane, anodes on one MEA 54a face anodes of the adjacent MEA 54b, and cathodes on one MEA 54b face cathodes of the adjacent MEA 54c. Thus when a plurality of fuel cell boards are stacked together, pairs of adjacent anodes and pairs of adjacent cathodes alternate in the plane vertical to the singly alternating anodes and cathodes.

Figure 4:
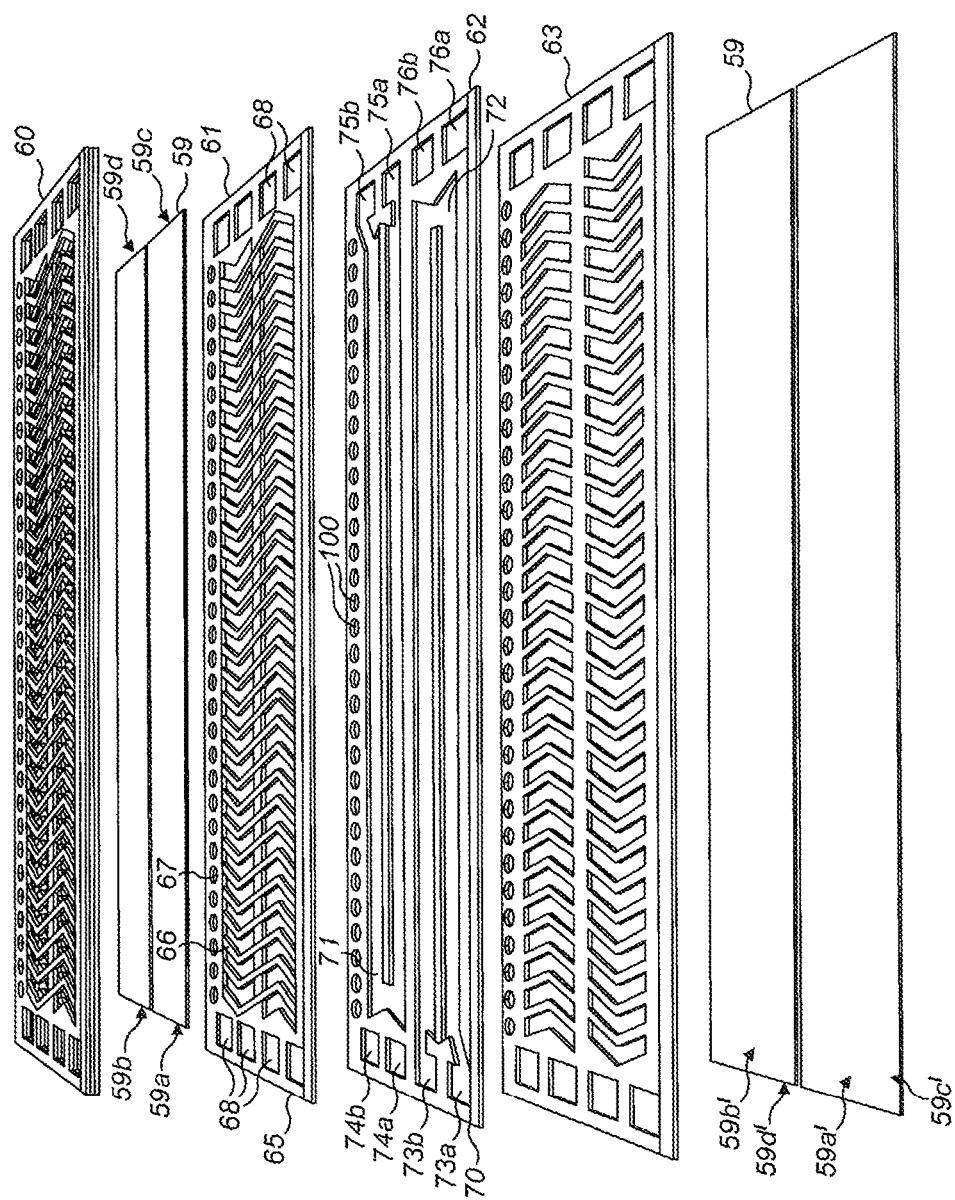
FIG. 4 shows an exploded view of the individual layers of the PCB board and MEAs of the embodiment.

As shown in FIG. 4, between each planar layer of MEAs 59, is a PCB board 60 that is made up of three individual layers. This PCB board comprises a first current collection and distribution layer 61, a reactant distribution layer 62, and a second current collection and distribution layer 63. These three layers are bonded together to form a single PCB board 60. By virtue of the current collection and distribution layer, current does not cross the electrolyte layer, but moves laterally from anode to cathode parallel to the horizontal plane of electrodes. Consequently, no through-membrane connections are necessary for the current to flow.

The individual layers of the PCB boards, i.e. the first and second current collection and distribution layers and the reactant distribution layers, are adhered together into a solid structure using an epoxy-containing glass fibre composite. The PCBs may be fabricated from pre-impregnated composite fibres, such that they contain an amount of the material used to bond the individual layers together and to bond the MEAs to the PCBs, or a pre-impregnated composite fibre mask may be applied to the PCBs. The MEAs may be laser bonded onto a PCB, thereby creating a fuel cell board 41. To create the fuel cell stack, a plurality of boards are laminated together. The gaps between the electrodes, and the sealing achieved in these gaps by the epoxy resin, prevent the fuel and oxidant gas flows from mixing, and prevent the fuel coming into contact with the cathode and the oxidant coming into contact with the anode, as described in more detail below. As this lamination step results in a solid structure, with good contact between the individual layers, the usually necessary heavy end boards become redundant. Accordingly, a monolithic, light, and completely sealed structure is produced. A simple PCB can be used as the end board.

When assembled into a fuel cell stack, an anode of a first MEA on a first fuel cell board lies vertically directly opposite an anode of a second MEA on a second fuel cell board, wherein the first and second fuel cell board are horizontally adjacent in the fuel cell stack. Similarly, a cathode of a first MEA, on a first fuel cell board, lies vertically directly opposite a cathode of a second MEA on a second fuel cell board, wherein the first and second fuel cell board are horizontally adjacent in the fuel cell stack.

The structure of a current collection and distribution layer 61 is shown in more detail in FIG. 4. FIG. 4 shows a section of the layer 61, corresponding to two adjacent MEAs 59. Referring to FIG. 4, the layer 61 consists of a frame 65, with panels of electrical distribution tracks 66 that link the anode 59a of one MEA to the cathode 59b of the vertically adjacent MEA. By virtue of the electrical distribution tracks of the current collection and distribution layer, the MEAs on each individual fuel cell board are connected in electrical series. As indicated by the arrows in FIG. 4, the anode 59a and cathode 59b are located on the underside of the MEA shown.

The upper side of the MEA carries the corresponding cathode 59c and anode 59d, respectively.

Figure 5A:
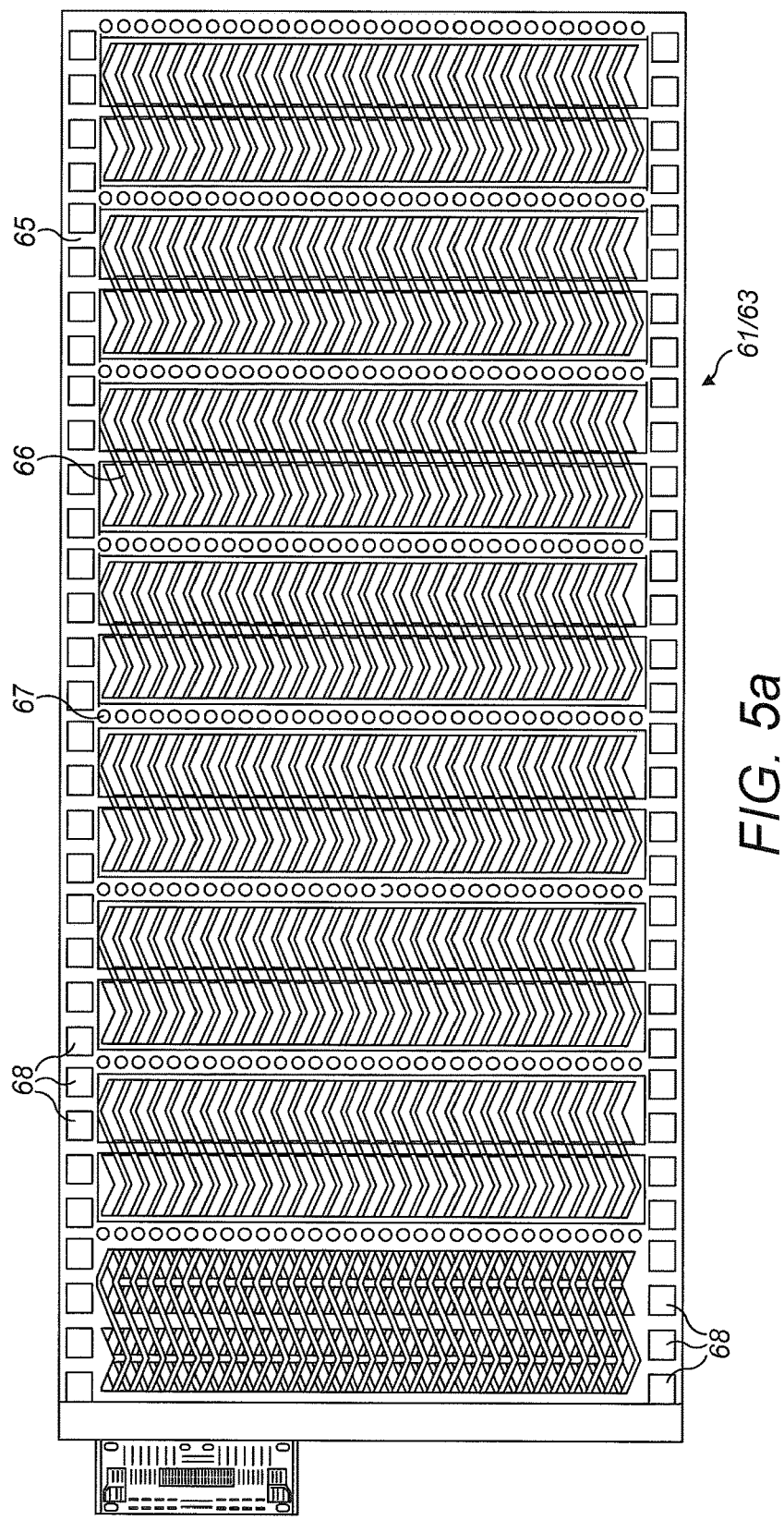
FIGS. 5 (a) and 5 (b) show a plan view of a current collection and distribution layer of the embodiment.
Figure 5B:
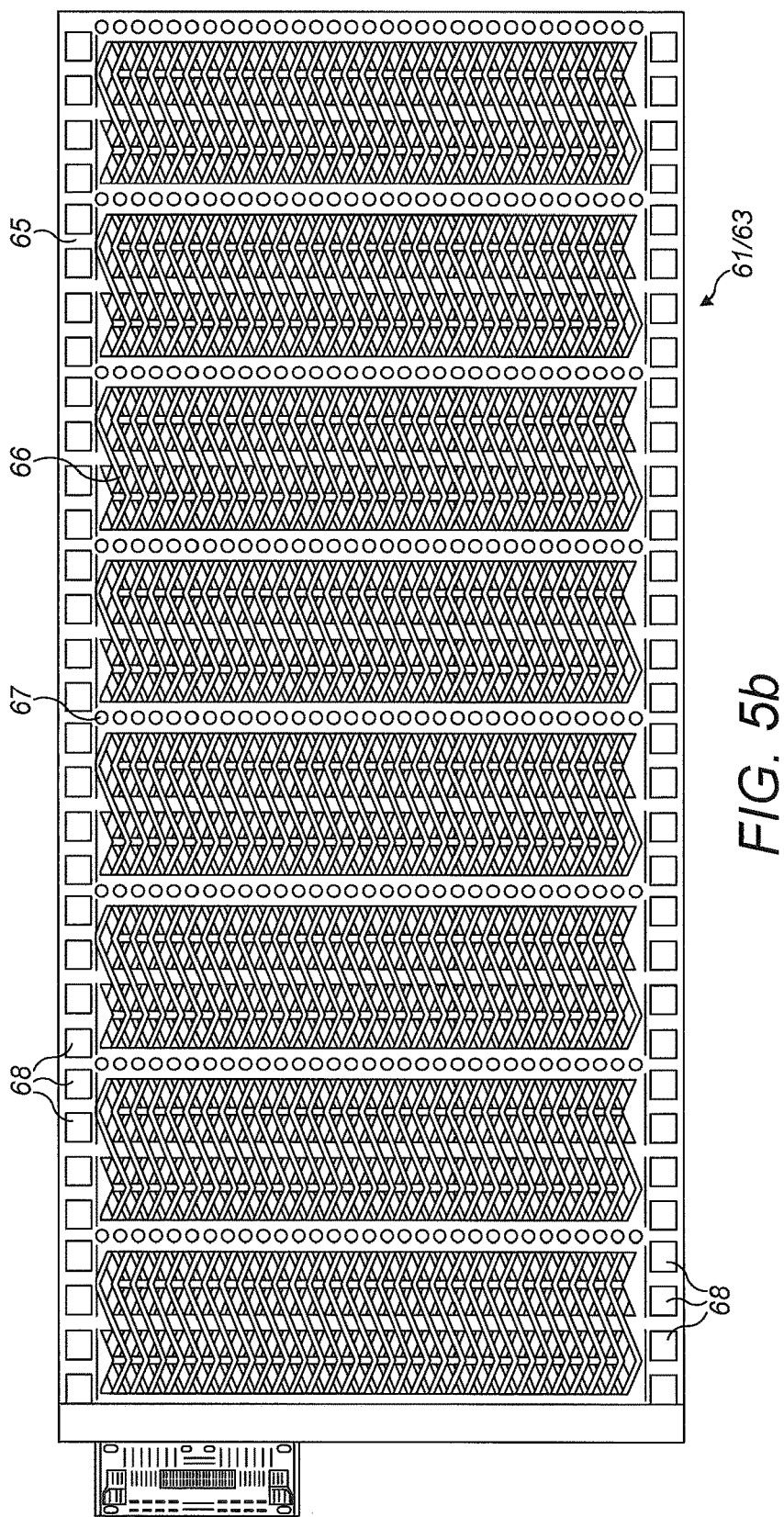

FIGS. 5a and 5b show a plan view of a current collection and distribution layer 61 for a planar layer of 16 MEAs. In FIG. 5b (and at the left hand side end of the layer shown in FIG. 5a), the plan view of a first and second current collection and distribution layer bonded together is shown. That is, the tracks 66 of the first and second current collection and distribution layer are visible. FIG. 5a (with the exception of the left hand side end of the layer) shows a plan view of only one current collection and distribution layer. Only a single layer of tracks is visible.

Holes 67 may be provided at regular intervals in the frame 65 to form part of an integral cooling system. These holes may form vertical cooling channels 42, as shown in FIG. 2. One or more fans 46 may be included to force the air into the cooling system.

The current collection and distribution layer 61 also includes holes 68 forming part of vertical reactant channels 43 (shown in FIG. 2), at the two opposed edges of the current distribution layer, adjacent to the narrow ends of the electrode bands.

These vertical channels 42, 43 are formed when the fuel cell boards 41 are stacked. In the embodiment shown in FIG. 2, the vertical fuel inlet and outlet channels run close to one edge 44 of the layer, and the vertical oxidant inlet and outlet channels run close to the opposite edge 45 of the layer. In the embodiment shown in FIGS. 2-7, there are two vertical fuel and oxidant channels per electrode. These vertical reactant channels connect with the channels provided in the reactant distribution layer.

Figure 6:
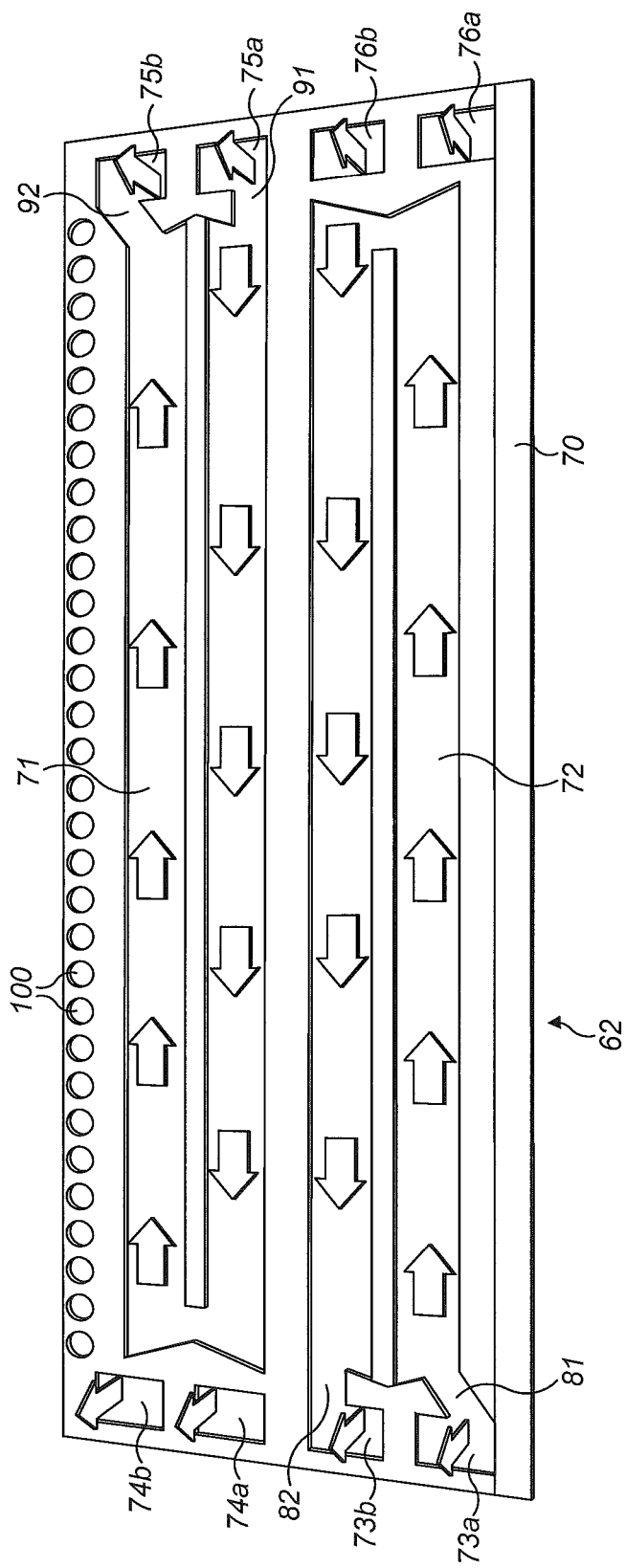
FIG. 6 shows a plan view of a reactant distribution layer of the embodiment.

The structure of a reactant distribution layer 62 is shown in detail in FIGS. 4 and 6, where a section of this layer 62, corresponding to two adjacent MEA 59 electrode pairs, is shown. This section is repeated, such that the number of reactant distribution channels corresponds to the number of MEAs or electrode pairs in the plane. The reactant distribution layer 62 comprises a frame 70, with two channels 71, 72, each forming a planar reactant distribution loop, and holes located close to two opposed edges of the frame, at the narrow ends of the distribution loops, forming vertical reactant channels.

Figure 7:
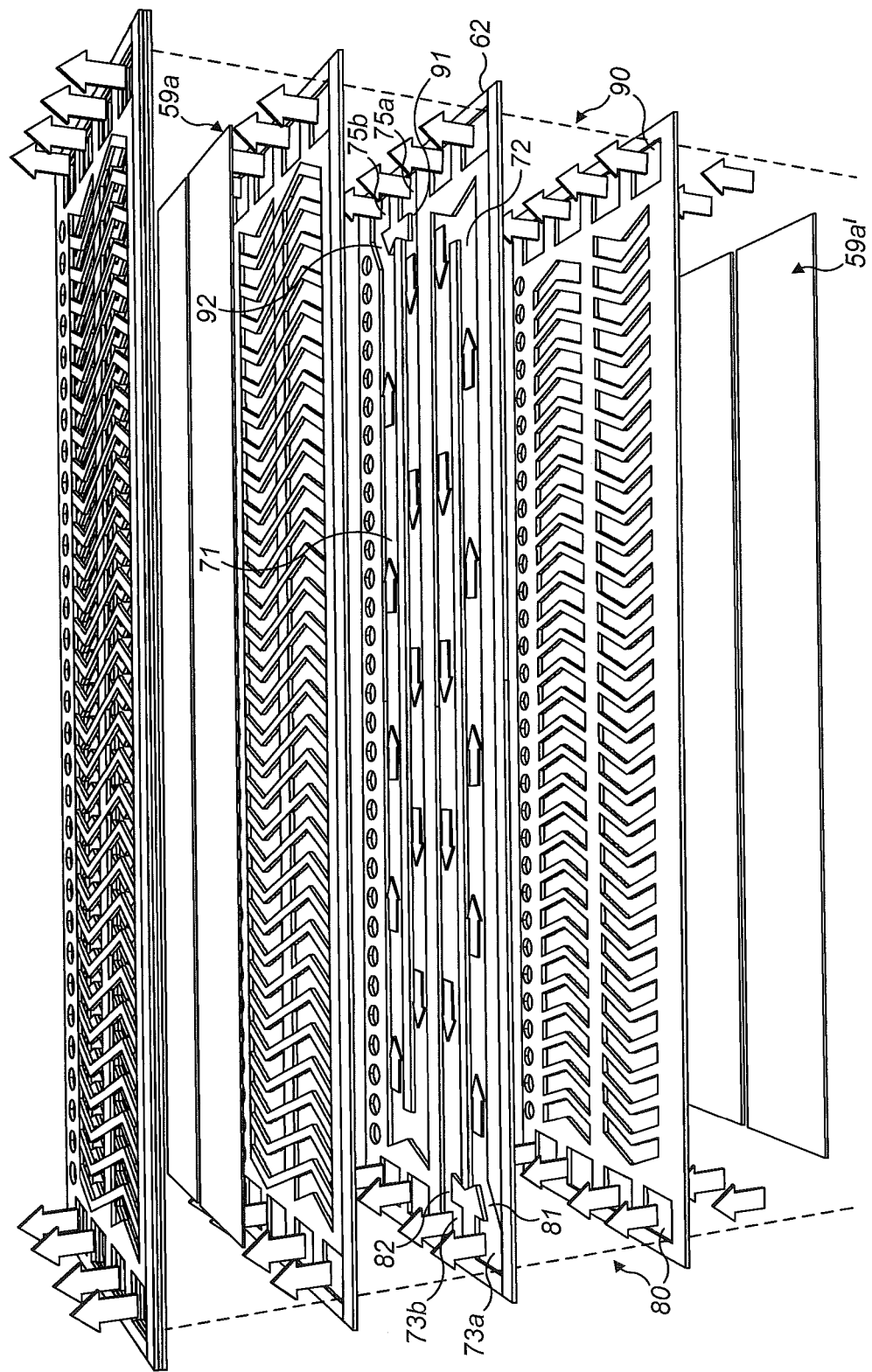
FIG. 7 shows an exploded view of the individual layers of the PCB board with reactant flow of the embodiment.

The holes along one edge of the frame 70 are sequentially inlet 73a, 74a and outlet 73b, 74b channels for a reactant, for example, a fuel, such as hydrogen and the holes along the opposite edge of the frame are sequentially inlet 75a, 76a and outlet 75b, 76b channels for a reactant, for example, an oxidant, such as oxygen or air. This is shown in FIGS. 4 and 7. The holes 73, 74, 75, 76 on the reactant distribution layer 62 line up with the holes 68 in the current collection and distribution layer 61 to create the vertical reactant distribution channels 43 shown in FIG. 2.

In the reactant distribution layer shown in FIG. 7, a reactant, for example a fuel, flows through the vertical channels 80 on one edge of the frame 70. When the location of the vertical channel corresponds to the location between two anodes 59a, 59a', the vertical channel is connected to the reactant distribution loop 72 of the reactant distribution layer 62. Accordingly, the fuel will flow from the vertical inlet channel 73a, into the entrance 81 of the distribution loop 72 of the reactant distribution layer, and along the faces of the anodes 59a, 59a' in the planes directly above and below the reactant distribution layer. The exit 82 of the distribution loop connects with the vertical fuel outlet channel 73b. The vertical channels 76a, 76b at the opposite edge of the frame, for example carrying the oxidant, are holes in the frame 70 that are not connected to the distribution loop 72.

In the planar adjacent MEA, the electrodes facing the distribution channel 71 are both cathodes 59b, 59b'. Accordingly, the layout of the distribution channel 71 associated with these electrodes is reversed: In the reactant distribution layer shown in FIGS. 4, 6 and 7, the oxidant flows through the vertical channels 90 on the right hand edge of the frame. When the location of the vertical channel corresponds to the location in the reactant distribution layer 62 between two cathodes 59b, 59b', the vertical channel is connected to the reactant distribution loop 71 of the reactant distribution layer 62. Accordingly, the oxidant flows from the vertical inlet channel 75a, into the entrance 91 of the distribution loop of the reactant distribution layer, and along the faces of the cathodes in the planes directly above and below the reactant distribution layer. The exit 92 of the distribution loop is adjacent to the entrance 91 of the distribution loop, and is connected to the vertical fuel outlet channel 75b that is adjacent to the vertical inlet channel 75a. The vertical channels 74a, 74b at the opposite edge of the frame, carrying the fuel, are not connected to the distribution loop 71.

In the adjacent fuel cell boards of the fuel cell stack, the sequence of anodes and cathodes is reversed. The reactant distribution channel layout thus alternates in sequence both in the horizontal and vertical plane, in order to supply vertically positioned pairs of anodes and cathodes with fuel and oxidant, respectively.

In all embodiments, the polymer electrolyte layer may be any electrolyte membrane, which allows ions (e.g. hydrogen ions) but not free electrons to pass through from one electrode to the other, for example, a sheet of Nafion™ membrane. The same preferred dimensions as described above for the first embodiment apply.

The reactant gas flows are kept separated by virtue of seals in the gaps between the electrodes of adjacent MEAs. These seals are achieved by impregnating the PCB boards with epoxy compounds, which are activated to create a tight seal upon lamination and boding with the MEA. If appropriate, further sealing may be incorporated by using seals made of PDMS, for example at the outer edges of a fuel cell board.

The vertical channels are connected to one or more reactant manifolds along the two opposed edges of the stack, which supplies and collects the reactants.

The frame of the reactant distribution layer may also comprise a series of holes 100 at regular intervals in the frame to form part of an integral cooling system, as described below.

The holes 67, 100 provided for the cooling system may be positioned between every electrode in a horizontal plane, or between every second, third, fourth, fifth, sixth, seventh, eight, ninth or tenth electrode, depending on the cooling required. The holes need not be at regular intervals between electrodes, but can be at any suitable interval.

The holes 67, 100 provided for the cooling system may be positioned between every electrode in a horizontal plane, or between every second, third, fourth, fifth, sixth, seventh, eight, ninth or tenth electrode, depending on the cooling required. The holes need not be at regular intervals between electrodes, but can be at any suitable interval.

In a further embodiment of the present invention, each fuel cell board 41 of the fuel cell stack comprises one or a plurality of polymer electrolyte membranes arranged in a plane. In a first alternative embodiment a) for each fuel cell board a series of individual membranes is aligned in a plane, with an anode on one face of the membrane and a cathode on the opposite side of the membrane. In a second alternative embodiment b) a single membrane is provided for each fuel cell board, with a series of anodes on one face of the membrane and a series of cathodes on the opposite side of the membrane. In both embodiments a) and b), all the anodes are positioned on one face of the one or more polymer electrolyte membranes in a horizontal plane, and all the cathodes are positioned on the opposite face of the one or more polymer electrolyte membranes in a horizontal plane. As in the preceding embodiment, anodes and cathodes lie directly opposite each other.

As in the preceding embodiment, the fuel cell boards are stacked so that the anode-side faces of two adjacent fuel cell boards face each other, and the cathode-side faces of two adjacent fuel cell boards face each other. In this manner, the fuel can be delivered to all the anodes on two adjacent fuel cell boards, and the oxidant can be delivered to all the cathodes on two adjacent fuel cell boards, in a simple manner.

As in the preceding embodiment, the MEAs are bonded onto a PCB board made of three separate layers, to form a fuel cell board. In the fuel cell stack, each planar series of MEAs is located between two PCB boards. Reactant delivery to the electrodes is achieved by the reactant distribution layer of the PCB board, as described for the preceding embodiment.

Heavy end plates are not necessary, as the fuel cell boards are laminated together into a solid structure. A simple PCB can be used instead of the heavy end board.

In embodiment a) of the further embodiment, in which each fuel cell board comprises a series of individual membranes, the electrical connections between anodes and cathodes are made either through the gaps between the membranes, as holes can easily be machined into the PCB boards, or by externally connecting the current collection layer of the PCB board of the anode side to the current distribution layer of the PCB board of the cathode side.

In embodiment b) of the further embodiment, in which a single membrane is provided for each fuel cell board, the electrical connections between anodes and cathodes are made either by through-membrane connections, as described for embodiment 1, or by externally connecting the current collection layer of the PCB board of the anode side to the current distribution layer of the PCB board of the cathode side.

The PCB reactant distribution layer is now described in more detail. The current collection and distribution layers are not required when the electrical connection is made via through-membrane connections or when electrical connections are made through the PCB board. When the electrical connection is made by externally connecting the PCB boards of the anode side to the PCB boards of the cathode side, the PCB boards facing the anodes will have a first and a second current collection layer, separated by a reactant distribution layer and the PCB boards facing the cathodes will have a first and a second current distribution layer, separated by a reactant distribution layer. The connections are made between the anode of a first MEA and the cathode of a second MEA, between the anode of a second MEA and the cathode of a third MEA, and so forth, depending on the number of electrode pairs on the fuel cell board.

Figure 8A:
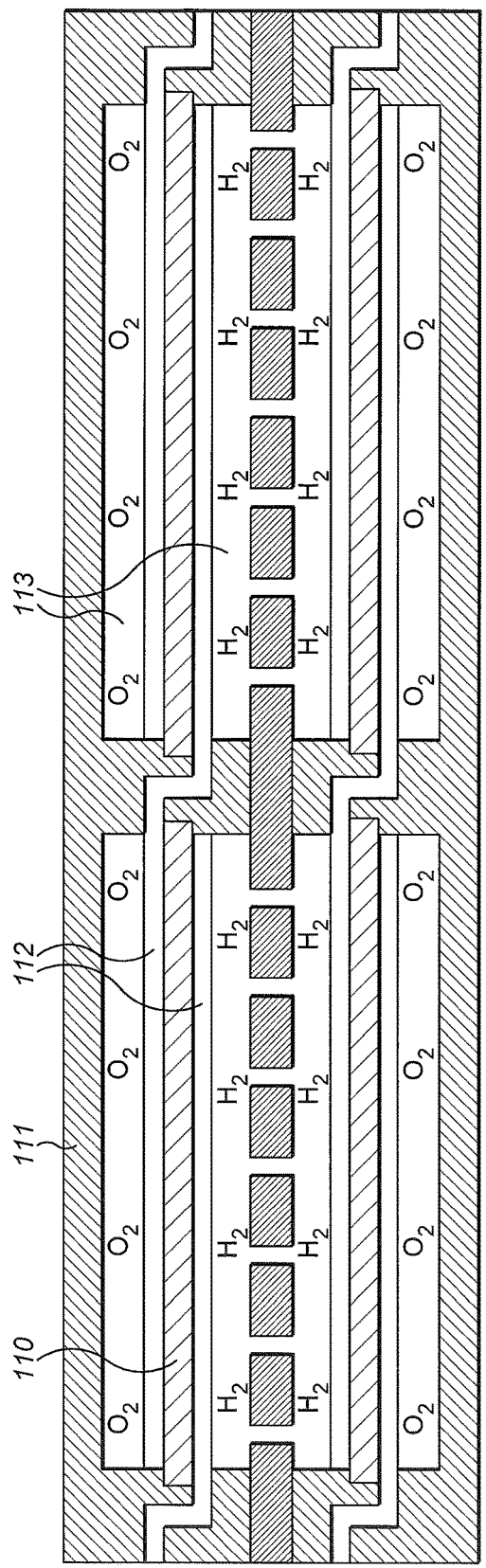
FIGS. 8 (a) and 8 (b) show a cross sectional view of a further embodiment.
Figure 8B:
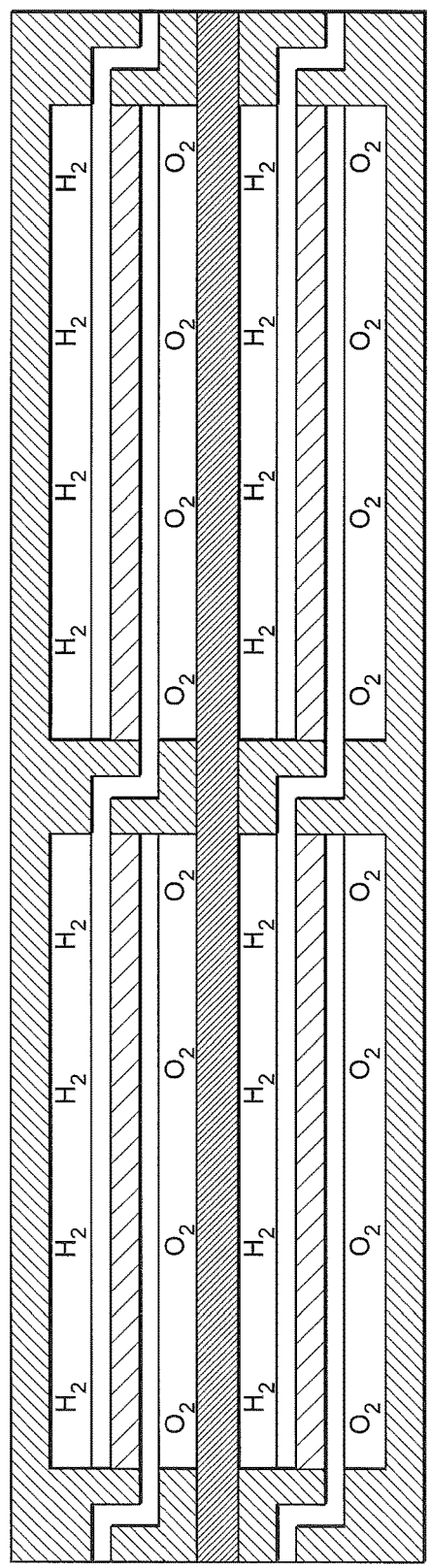
Figure 8C:
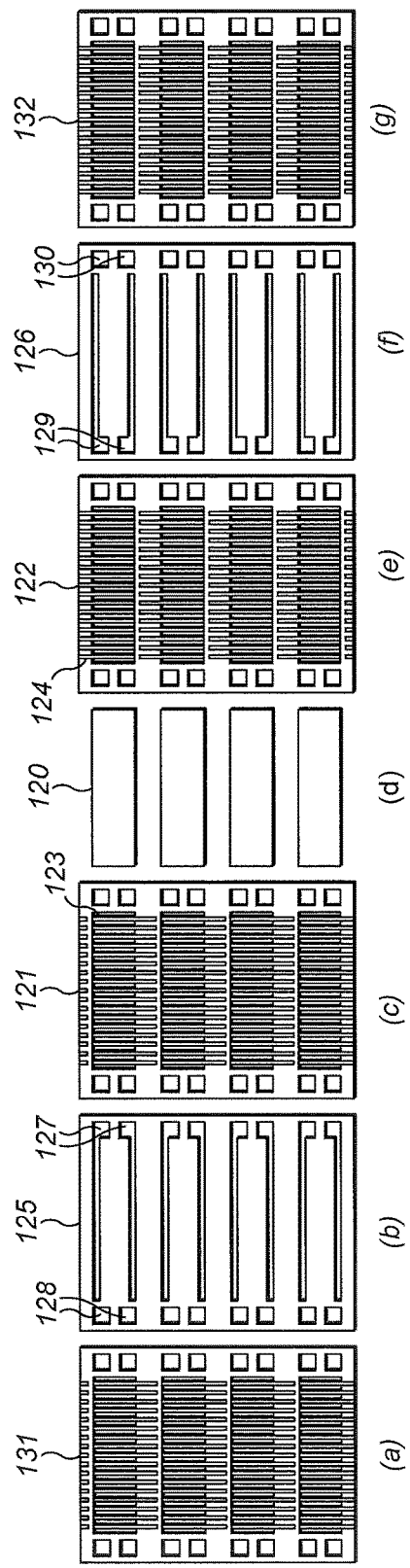

FIG. 8 (a) shows two layers of a fuel cell stack, comprising an MEA 110, PCB material 111, an electrically conducting layer 112 that conducts the current from the anode of a first cell to the cathode of the next cell, and reactant distribution channels 113 to carry the reactants to the electrodes.

FIG. 8 (b) shows an alternative layout.

FIG. 8 (c) shows an extract of the fuel cell structure, with one set of fuel cell electrodes sandwiched between two sets of three separate boards. The individual subsections are laminated together. Four fuel cell electrodes 120 are configured in electrical series. Adjacent to the cathode side is a lower cathode contact board 121 and an upper anode contact board 122. The contact boards have slots cut into them so that reactant from the inlet channel can flow to the outlet channel. The boards carry conducting bars 123, 124 that carry the current laterally. In FIG. 8 (c) the cathode board is shown with the conductor layer facing up, whereas in reality the conductors would face towards the electrodes 120. Adjacent to the lower cathode contact board 121 is an inner air distribution layer 125. This layer has sets of inlet and outlet channels 127 for the air (oxygen), and holes for the hydrogen inlet and outlet channels 128. Each channel flows to the corresponding reactant plenum. Adjacent to the upper anode contact board 122 is an inner hydrogen distribution layer 126, comprising hydrogen inlet and outlet channels 129 and air inlet and outlet channels 130. Adjacent to the inner air distribution layer 125 is an upper cathode contact board 131 and Adjacent to the inner hydrogen distribution layer 126 is a lower anode contact layer 132. The contacts on the lower side of the lower cathode contact board 121 are designed to connect to the connectors of the upper anode contact board 122, placing the MEAs 120 in electrical series.

PCB technology (or other similar technology) is used to manufacture elements of the fuel cell stack of the second and third embodiment. This enables the elements to be manufactured in large quantities and at low cost. For example, multiple flow field boards can be manufactured at the same time, by using thin laminate boards which are stacked and then simultaneously routed. Individually routed boards are then stacked and laminated together.

PCBs for the present invention are produced in the known way. Insulating layers may be made of dielectric substrates such as FR-1, FR-2, FR-3, FR-4, FR-5, FR-6, CEM-1, CEM-2, CEM-3, CEM-4, CEM-5, polytetrafluoroethylene, and G-10, which are laminated together with an epoxy resin prepreg. In order to yield conductive areas, a thin layer of copper is either applied to the whole insulating substrate and etched away using a mask to retain the desired conductive pattern, or applied by electroplating.

Each individual layer of the PCB board is 30 µm-2 mm thick, preferably 50 µm-1 mm thick, more preferably 0.1 mm-0.8 mm thick, most preferably about 0.4 mm thick. Each PCB board is thus 90 µm-6 mm thick, preferably 150 µm-3 mm thick, more preferably 0.3 mm-2.4 cm thick, most preferably about 1.2 cm thick. The electrode layer is 0.1 mm-1 mm thick, preferably 0.3-0.6 mm thick, more preferably 0.4 mm thick. Thus the cell pitch is preferably 1.6 mm thick (1.2+0.4 mm), thus allowing 16 cells per inch.

For the first, second and third embodiment of the present invention, the electrode bands are 1 mm-5 cm in width, preferably 5 mm-15 mm in width, more preferably about 1 cm in width. The size of the gaps between the electrode bands is dependent on whether they accommodate cooling channels. The gaps between the electrode bands with a cooling channel are between 1 mm-1.5 cm wide, preferably between 2 mm and 1.2 cm wide, more preferably between 5 mm and 1 cm wide. The gaps between the electrode bands without a cooling channel are between 0.5 mm-1 cm wide, preferably between 2 mm and 8 mm wide, more preferably between 3 mm and 6 mm wide.

For the first, second and third embodiment of the present invention, a catalyst layer is preferably provided on the electrodes. This layer may be made of suitable catalytic material for the reactions of interest, as is commonly understood by a researcher skilled in the art of producing fuel cells. For example, the catalyst layer may be composed of platinum nanoparticles deposited on carbon and bound with an proton conducting polymer (e.g. Nafion™), as described in "PEM Fuel Cell Electrocatalysts and Catalyst Layers Fundamentals and Applications", Jiujun Zhang (Ed.), 1st Edition., 2008, XXII, 1137 p. 489 illus., Springer-Verlag London, ISBN: 978-1-84800-935-6.

A gas diffusion layer may be included adjacent to the catalyst layer. The gas diffusion layer may be fabricated or deposited in any appropriate manner as will be familiar to the skilled reader. For example, the gas diffusion layer in a typical fuel cell is composed of carbon in one of a number of forms mixed with a number of binders and additives to modify the wetting characteristics of the layers. Typically the gas diffusion layer adjacent to the catalyst layer is composed of a microporous layer of carbon powder bound with PolyTetraFluoroEthylene (PTFE) (this layer has very small pores). Adjacent to this microporous layer is a further backing layer, typically composed of carbon fibers—either woven into a cloth, or bound together in some form of non-woven material, such as a paper. This layer has pores of a larger size.

The combination of these two layers provides a gradation in pore size in moving from the gas-channel to the catalyst layer. Sometimes rather than two discrete layers, the microporous layer and the porous backing layer interpenetrate.

Typically the thickness of the gas diffusion layer is around 100-1000 In commonly used modern fuel cells, the choice of carbon as the major constituent of the gas diffusion layer is dictated by the further constraint that electrical current must be conducted from the catalyst layer to the ribs of the bipolar plate. Most other materials that might be used are either not sufficiently corrosion resistant (many other metals), or are too expensive (gold, platinum etc.)

In the design of the current invention, the gas diffusion layer may be composed of the same materials i.e. carbon powder and/or fibers bound together with a suitable binder and treated with a suitable chemical to modify its hydrophilicity. However, because transport to electrons in a direction normal to the surface of the electrode is not required, the gas diffusion layer may alternatively be composed of non electrically conducting materials which nonetheless have suitable properties. The exact nature and electrical conducting properties are dictated by the electrical conductivity requirements of the surface layer—because current must be conducted along the surface of the MEA, requiring a high enough value of the electrical conductivity so that ohmic loss (surface current—layer resistance) is small (i.e. <10-20 mV).

Examples of material out of which the gas diffusion layer can be composed are porous forms of the following: inorganic oxides ($Al_2O_3$, $SiO_2$); plastics: (ptfe, poly ethylene, poly sulfones, etc); other inorganic materials: nitrides, carbides, phosphates, sulphates etc. In some cases, e.g. for thick catalyst layers, the catalyst layer may provide sufficient electrical conduction itself—in this case the gas diffusion layer does not need to be electrically conducting and may even be omitted. In other cases it may be necessary to have some of the current carried through the gas diffusion layer, in which case it would need to be composed (at least partially) from carbon or other electrically conducting material. In all cases, the gas diffusion layer can be made to be quite thin, for example, less than 100 μm, more preferably less than 25 μm. A thinner gas diffusion layer enhances transport of reactants to and from the catalyst layer.

According to aspects of the present invention, yet further improvements have been identified to enhance operation of the configuration above or similar configurations having a layered configuration.

The various aspects described below can be implemented in combination or individually. For ease of reference various of them are shown in combination with reference to the schematic diagram in FIG. 10 which shows, in section, part of a fuel cell stack operating generally in accordance with the principles described above. A cathode 150 of any appropriate type has a gas diffusion layer 152 in communication with a gas diffusion layer 154 described in more detail below. The anode structure is coplanar with the cathode structure and similarly composed as can be understood, for example, with reference to FIG. 7. In the vertical dimension the structure is repeated with electrolyte 156 and an anode structure 158.

According to first aspect, the gas diffusion layer 152 is bonded directly to the flow field 154 hence providing a reduction in contact resistance between them. In practice this is found to be less than 10 mΩcm².

This provides an improvement over existing arrangements in which contact resistance varies significantly as a function of position between the edges and the centre where the contact resistance is significantly higher. This is due, in known arrangements, to distortion of the end plate and non-uniform pressure distribution. Known approaches include providing a stiff and thus weighty end plate to reduce distortion and apply even pressure across the entire width of the plate.

According to the first aspect where direct bonding is providing between the flow field and the gas diffusion layer, the variation of contract resistance with position is minimised and has a consistently low value hence improving operation of the device. Further this is independent of compression such that end plates are not required to achieve low contact resistance and removing the requirement of having uniform compression across the entire flow field. It will be appreciated that this can be applied to any appropriate fuel cell system.

The manner of bonding can be in any appropriate form for example gluing by screen printing, spraying, painting or dipping an adhesive and pressing the gas diffusion layer into contact with the flowfield. The adhesive can be applied onto either the flowfield or the gas diffusion layer, although it should ideally be applied only where the gas diffusion layer is to be bonded to the flowfield. Care must be taken so that the adhesive does not excessively block the porosity of the gas diffusion layer. The adhesive may either be an electrical insulator (in which case electrical conduction occurs through mechanical contact of the gas diffusion layer with the flowfield), or it may be an electrical conductor. If it is an electrical conductor, it must satisfy the anti-corrosion requirements for fuel cell components. In a preferred embodiment, the glue is composed of the same material as used to passivate the flow-field surface.

According to a second aspect the corrosion potential of fuel cells resulting from the reactant materials used can be significantly reduced by applying appropriate coatings to the flow field or PCB 154. In particular screen printing or similar coating methods (e.g. spray coating) of the PCB with conductive carbon ink allows current flow but reduces corrosion rate and hence breakdown despite the harsh environment. Materials which can form the basis of the screen printing include:

PCB1 sunchemical ink 2sp
PCB2 sunchemical ink 2sp+PEDOT
PCB3 sunchemical ink 2sp revisited
pcb4 sunchemical ink (last) 2sp
PCB5 sunchemical 2sp+PEDOT (last)

Using these approaches it is found that the stability of the components is significantly increased whilst at the same time maintaining a low contact resistance.

Figure 11:
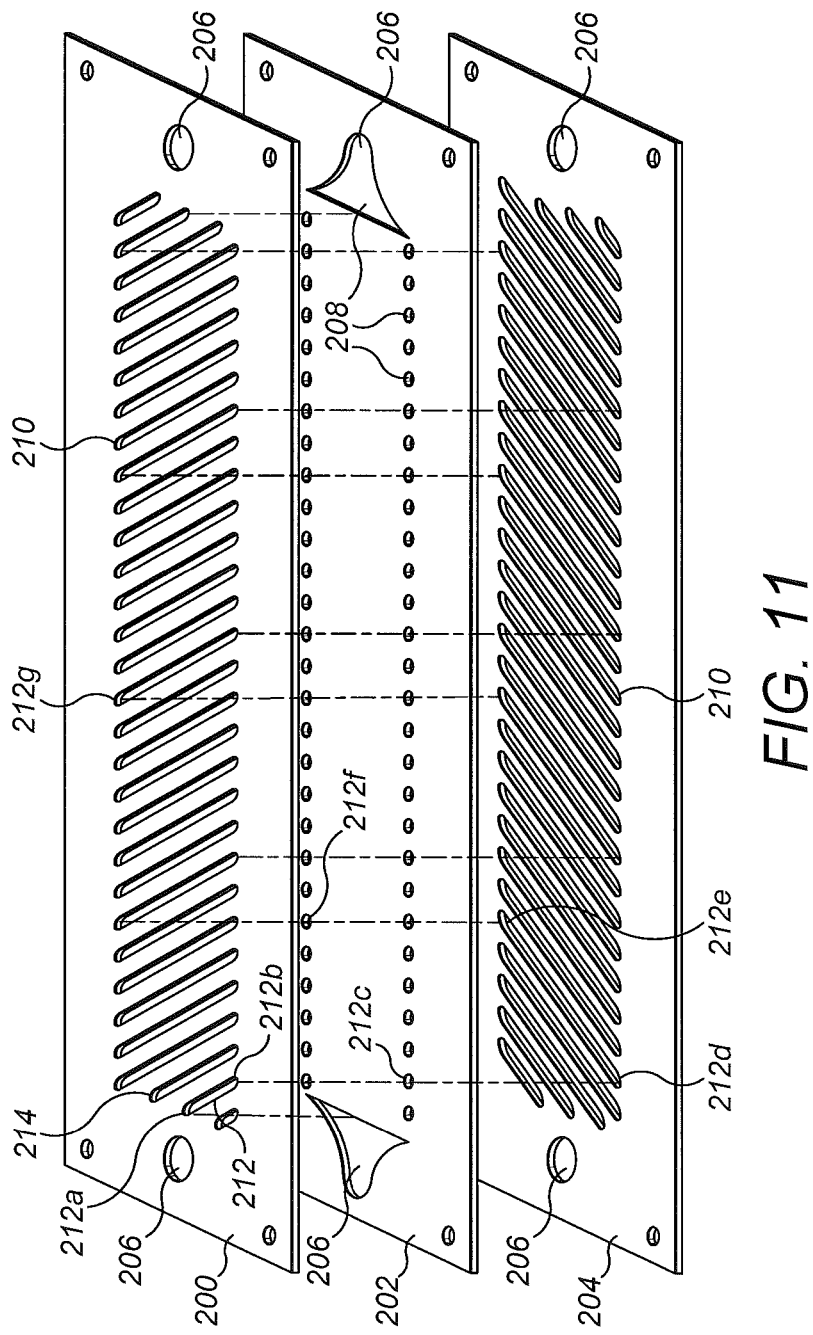
FIG. 11 shows a three dimensional flow field according to an embodiment.

According to a third aspect, the nature of the flow field can be understood in more according to an improved configuration with reference to FIG. 11.

In particular a flow field is shown including multiple layers with flow channels and flow channel connections to provide a flow path traversing the layers hence providing three dimensional flow. Referring to FIG. 11 three layers 200, 202, 204 are provided. As discussed above these can for example be PCBs for example of 0.4 millimeters thickness laminated together or any other appropriate configuration. In a manner similar to that described with reference to FIG. 7, reactant can enter and leave the flow field via stacked orifices 206. Reactant is channelled to the flow path via the passage 206 in the central layer 202 and follows a flow path traversing both top and bottom layers via connection formations in the central layer.

In particular, the central layer 202 includes multiple apertures 208 which are aligned with grooves or slots or channels 210 in the top and bottom layers 200, 204. The channels run diagonal and parallel to each other in the top layer 200 and diagonal and parallel to one another in the bottom layer 204, but in the opposed orientation. A particular angle of orientation can be selected as appropriate. The channels 210 and apertures 208 are aligned such that individual sub sets of the channels in the top and bottom layers communicate with one another exclusively hence effectively providing multiple independent channels.

As can be seen in FIG. 11, for example, a channel 212 communicates at one end 212a directly with inlet 206 in the central layer 202. The other end of the channel 212b communicates via an aperture 212c in the middle layer 202 with a first end 212d of a corresponding, oppositely oriented channel in the bottom layer 204. The other end of this 212e communicates via aperture 212f in the central layer with an end 212g of a channel in a top layer 200. This path continues until the flow channel reaches the outlet port 206 in the central layer 202.

Because of the orientation of the channels in the diagonal configuration it will be seen that therefore the channels forming the flow path generally designated 212 form a subset of the total number of channels available hence providing an independent flow path. A further flow path 214 comprising a separate subset of flow channels communicating with the inlet and outlet port along top and bottom layers can be defined and so forth. The number of flow paths can be selected in any appropriate manner and can be influenced, for example, by the angle or orientation of the flow channels adopted.

It will be appreciated that many different configurations can be adopted and bonding between the layers can be provided in any appropriate manner for example via a pre-preg layer or other suitable bonding agent. As a result inter digitated flow fields can be provided with large inter-action area and relatively low pressure drop. Another benefit of this geometry is that the current flow path remains relatively unimpeded across the face of the associated layers, 200 or 204, especially in the direction to the next cell. This is not the case with the meander or serpentine flow fields typically utilised in fuel cells, in which the channel acts as a barrier to effective lateral current flow.

As a result of the geometrical approach it is possible to machine multiple copies of each set of board—200, 202, and 204, by stacking multiple sheets together and routing (or otherwise removing all material in a given region) across the multiple boards simultaneously. This process also requires all parts of the layer must be attached to the rest of the layer, otherwise they will be detached from the rest of the board—i.e. there can be no routing paths which form a complete bounded area. The flow field described fulfils this requirement.

Figure 13A:
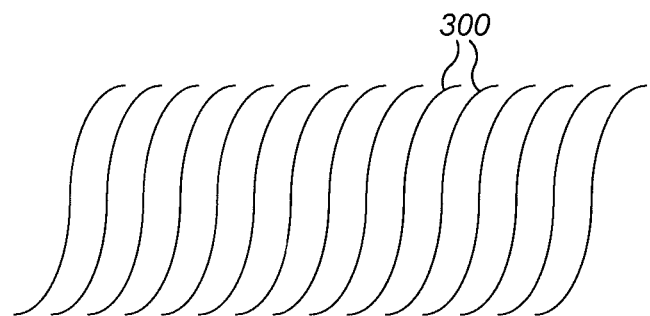
FIGS. 13a to 13c shows alternative channel configurations for a flow field.
Figure 13B:
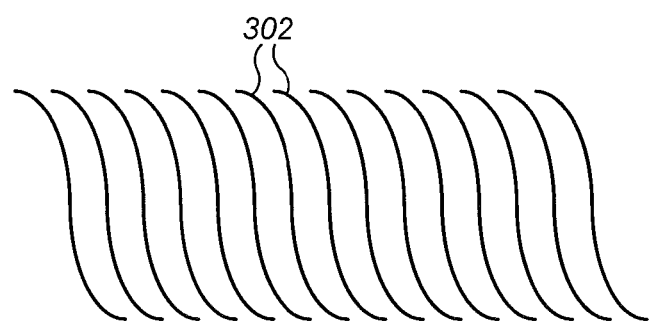
Figure 13C:
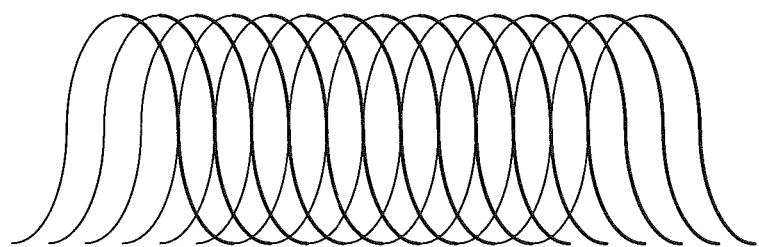

Turning to FIGS. 12 and 13 alternative configurations are shown including two or three layer configurations. Referring for example to FIGS. 12a to 12c two-serpentine arrangements are shown providing communication between inlet and outlet ports 230 in one of the layers (or indeed with the inlet port in one layer and the outlet port in the other layer). In particular, one of the layers effectively provides elongate flow channels 232 connected to each other and to the inlet and outlet ports via connection portions 234 in the other layer. In typical fuel cells, the connection portions would be on the same layer as the flow channels, 232. However, a negative point with having both 232 and 234 on the same layer is that it impedes lateral electrical current flow. The elongate portions can run generally perpendicular to the flow direction between the inlet and outlet ports and the connections portions 234 can be curved or straight channels between the ends of the elongate portions. As a result a serpentine configuration is provided. Referring to FIG. 12b, the flow channels 232 again run parallel and perpendicular to the direction of flow but are connected so as to provide parallel flow paths. In particular first and fourth flow channels 232 are joined by connection portion 234 to form an outer path 236 and second and third flow paths are connected to form an inner flow path 238. This configuration is repeated such that the inner flow path becomes the outer flow path and vice versa providing two paths to the outlet 230. Referring to FIG. 12c a further variant is shown in which three individual flow paths 240, 242, 244 are provided by connecting non-adjacent channels appropriately.

Referring to the configurations of FIGS. 12d, 12e, 12f and 12g, a "spiral" configuration is shown formed of three layers although the middle layer can, as with other embodiments, be formed from a thin layer such as pre-preg layer to provide connection. The arrangement of FIG. 12d is similar to that of FIG. 11 above in which top and bottom layers have flow channels parallel on each layer but opposing on respective layers. In the arrangement of FIG. 12d a configuration including two flow paths 250, 252 is shown where the first channel of the top (or bottom) layer connects to the second channel of the bottom (or top) layer and vice versa.

Turning to FIG. 12e an alternative spiral arrangement is shown in which four separate flow paths 260, 262, 264 and 266 are provided. In order to achieve this, an additional central conduit 268 is provided to feed the additional two paths although it will be appreciated that the number of feed conduits can vary dependent on the geometry. Referring to FIG. 12f four conduits are provided supplying six paths in total. Referring to FIG. 12g five conduits 270 are provided to feed eight paths.

An advantage of the spiral configuration is that lateral space outside the electrode area is used more efficiently than in the serpentine arrangement allowing improved packing density.

In yet a further improvement, the potential resistance provided by flow paths non-parallel to overall flow direction can be further reduced allowing minimisation of pressure drop and of changes in direction of the flow which in turn reduce turbulence. In particular, referring to FIG. 13, instead of using straight line segments as flow channels, curvature can be provided for example at the ends of the channel segments providing a gradual change in direction and hence improving flow characteristics. Hence it can be seen in FIGS. 13a and 13b that the segments 300 on one of the layers are generally S shaped with a shallow curvature at top and bottom and the segments in the other layer 302 are the same configuration but oriented in reverse such that, as shown schematically in FIG. 13c, a smooth overlap of flow paths is provided improving flow characteristics.

Turning to a fourth aspect of the invention, a water distribution strategy is described allowing wicking away of excess liquid water whilst simultaneously fully humidifying reactant gases. In particular, as shown in FIG. 14, a wicking material 310 such as micro porous glass fibre matting is sandwiched between two pre-preg layers 312 to form a multi layer composite structure. As can be seen from FIG. 14 this is placed between two integrated PCB/MEA boards 314, 316 within the gas flow region. The wicking layer can communicate with a water inlet 318 and a water outlet 320 to allow excess water 322 to be removed whilst providing humidification 324 of the reactant gases. Water can be actively inserted or removed into the fuel cell structure for example for preventing water freezing within a fuel, and this can be achieved by appropriate pumping means via conduits 318, 320. Alternatively passive regulation of water can be achieved by balancing capillary pressure with gravity driven water flow. As a result an improved water management strategy is provided. It will be appreciated that the egress to the wicking material itself through the outer layers 312 can be in any appropriate manner. For example the layers can be drilled or printed to provide appropriate apertures for water flow. In the configuration described the wicking material does not need to be electrically conductive and hence can be formed of a polymer or inorganic fibrous material avoiding problems of erosion, exacerbated by the high surface area of the materials and related issues. Hence provision of the wicking material in the geometry described is surprisingly advantageous.

Figure 10:
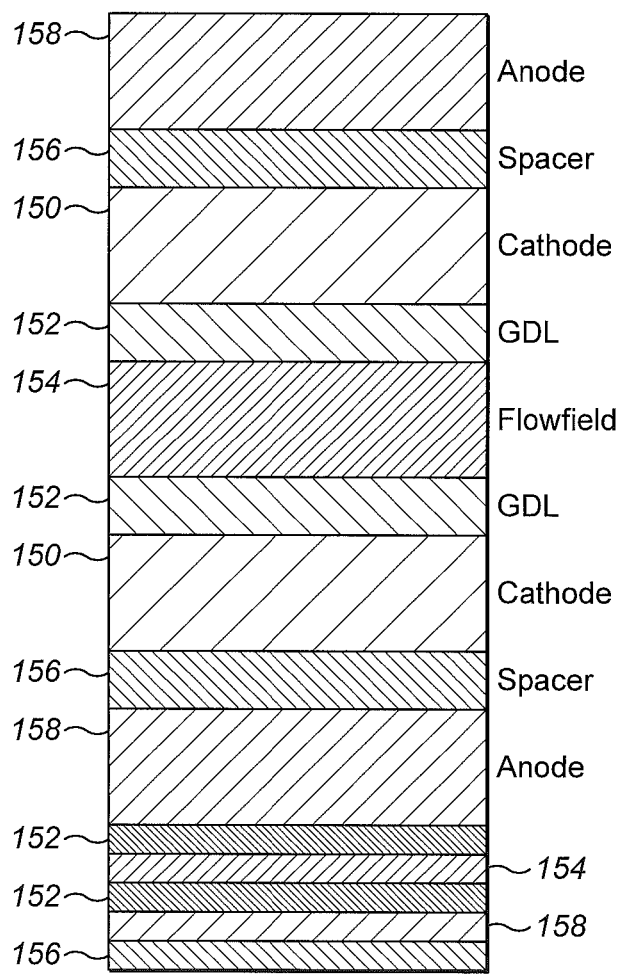
FIG. 10 shows a vertical cross section of a layered arrangement according to one of the embodiments.

Referring to the embodiment of FIG. 10 or 11, and the corresponding geometry of FIGS. 12 and 13, the wicking structure of FIG. 14 can for example be located on an extra internal layer of the flow field 154, 202 or 204 with appropriate through passages for said flower can, for example, replan the central layer 202 with suitable aperture 208, such that the flow channel is shown as 326 in cross-section in FIG. 14.

Figure 15A:
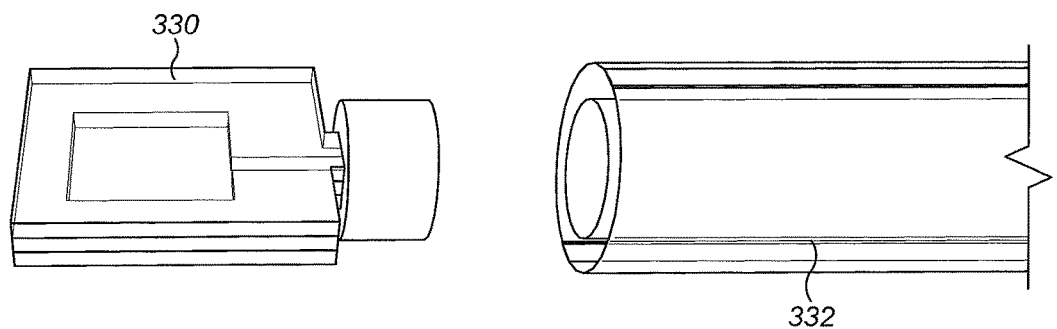
FIGS. 15a and 15b show means of fitting an MEA to a flow reactant tube.
Figure 15B:
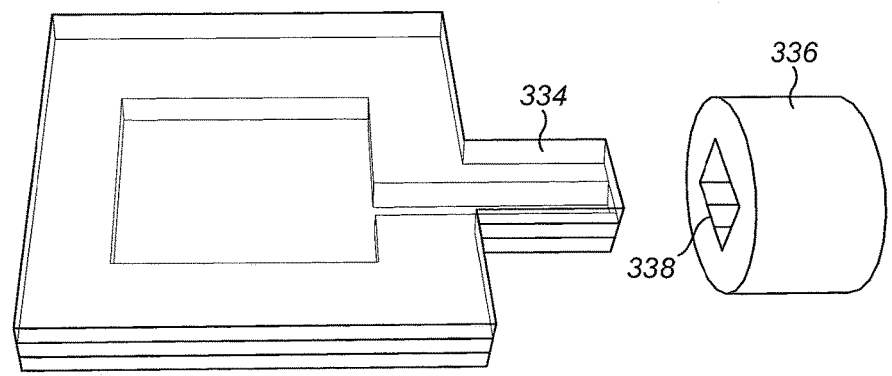

In a fifth aspect shown in FIGS. 15a and b, a manner of connecting an MEA 330 to a flow reactant tube 332 is shown. In particular the MEA comprising a plurality of laminate layers has an extension 334 shown in FIG. 15b comprising a rectangular protrusion aligned for each layer. A connector 336 is providing having an aperture 338 shaped to receive the extension 334 neatly and allowing connection to the pipe 332. Hence the PCB flow reactant channel can be converted into a suitable cylindrical connector for easily fastening of the tube to the fuel cell. The connector 336 can be formed in any appropriate manner and can additionally be machined for enhanced connection to the tube 332 as appropriate.

Figure 16A:
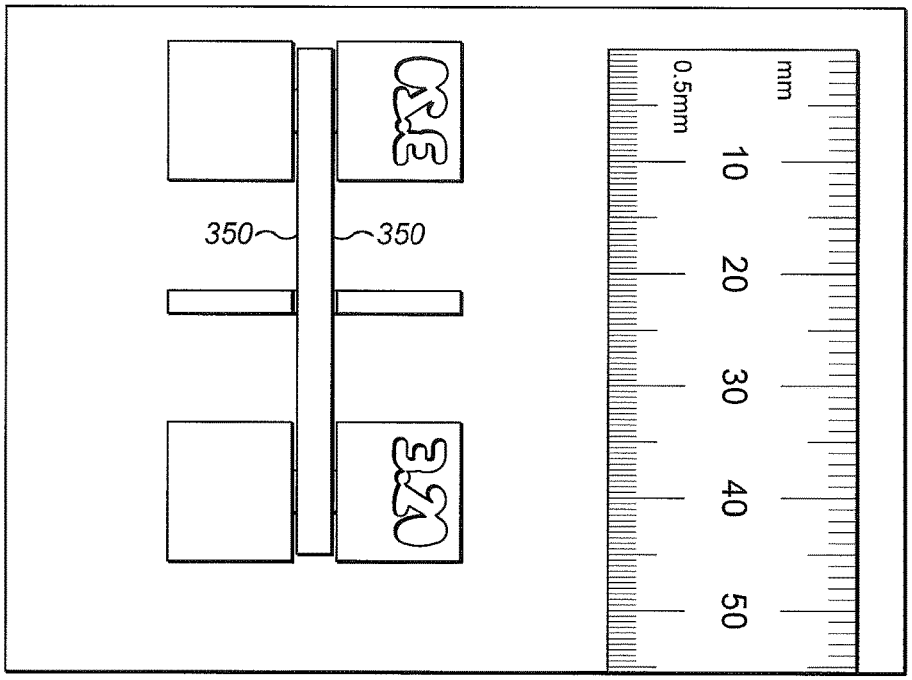
FIGS. 16a and 16b show a manner of fixing MEA layers together.
Figure 16B:
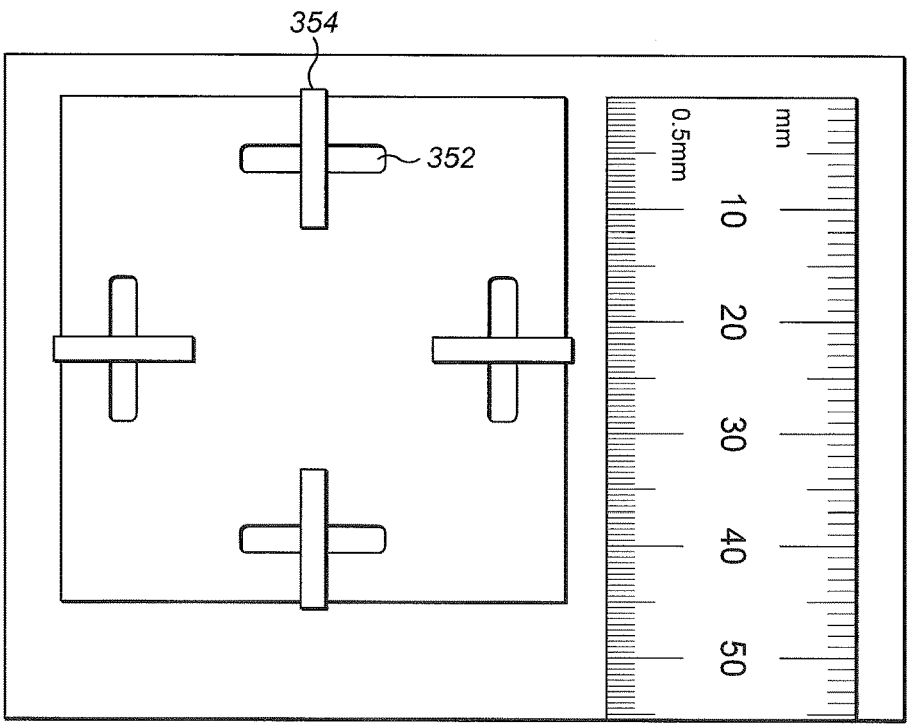

According to a sixth aspect in FIG. 16 multiple layers 350 comprising for example MEAs or flow fields as described above are connected in an improved manner. In particular the layers 350 have aligned slots 352 into which a key 354 can be inserted. The key has a waist at its centre of approximately the same dimension as the depth of the boards such that after insertion the key can be rotated 90 degrees to hold the boards firmly together. Any appropriate number of slots and keys can be provided to arrive at the desired level of contact. For example in the embodiment shown four slots are provided, one parallel to each edge of the generally square structure.

It will be appreciated that the embodiments described herein can be combined or interchanged as appropriate and different components for different embodiments can work functionally with other embodiments as appropriate. The materials from which the components are made can be selected as appropriate from known fuel cell or other functional materials and the manners of fabrication can, unless explicitly set out herein, be selected appropriately as would be apparent to the skilled person.

The technologies can be applied to fuel cells of any type and dimension and any appropriate gas and electrode/electrolyte technology.

What is claimed is:

1. A fuel cell comprising a flow field component comprising:
    a first layer having first layer flow channels;
    a second layer having two parallel series of flow channel connection formations, a second layer inlet port and a second layer outlet port;
    a third layer having third layer flow channels; and
    wherein the second layer is disposed between the first layer and the third layer,
    wherein the first layer flow channels, the third layer flow channels, and the two parallel series of flow channel connection formations are connected to one another provide a plurality of discrete continuous flow paths between the second layer flow inlet port and the second layer flow outlet port of the flow field component by
        a first end of a portion of the first layer flow channels communicating with a corresponding first end of a portion of the third layer flow channels via a first of the two parallel series of flow channel connection formations, and
        a second end of each of the portion of the third layer flow channels communicating with a corresponding second end of each of the portion of the first layer flow channels via a second of the two parallel series of flow channel connection formations
    wherein first layer flow channels and the third layer flow channels are configured to allow a flow therein to continuously travel in a direction from the second layer flow inlet port to the second layer flow outlet port.

2. The fuel cell as claimed in claim 1 in which the first layer flow channels and the third layer flow channels are curved towards one another at the two parallel series of flow channel connection formations.

3. The fuel cell as claimed in claim 1 in which the flow channel connection formations comprise one of an aperture or a channel.

* * * * *